United States Patent
Xie et al.

(10) Patent No.: US 11,856,963 B2
(45) Date of Patent: Jan. 2, 2024

(54) DEVICE AND METHOD OF PREPARING COMPOSITE ICE GLAZE

(71) Applicant: Shanghai Ocean University, Shanghai (CN)

(72) Inventors: Jing Xie, Shanghai (CN); Wenhui Yu, Shanghai (CN); Jinfeng Wang, Shanghai (CN); Mingtang Tan, Shanghai (CN); Xuesong Wang, Shanghai (CN); Jianrong Li, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 594 days.

(21) Appl. No.: 16/743,059

(22) Filed: Jan. 15, 2020

(65) Prior Publication Data

US 2020/0146303 A1    May 14, 2020

Related U.S. Application Data

(63) Continuation of application No. PCT/CN2019/124517, filed on Dec. 11, 2019.

(51) Int. Cl.
*B01F 35/00* (2022.01)
*A23B 4/09* (2006.01)
(Continued)

(52) U.S. Cl.
CPC ............ *A23B 4/09* (2013.01); *A23B 4/26* (2013.01); *B01F 27/05* (2022.01); *B01F 27/0724* (2022.01); *B01F 27/112* (2022.01); *B01F 27/806* (2022.01); *B01F 33/81* (2022.01); *B01F 35/2112* (2022.01); *B01F 35/21112* (2022.01);
(Continued)

(58) Field of Classification Search
CPC ........ A23B 4/09; A23B 4/26; A23V 2002/00; B01F 27/05; B01F 27/0724; B01F 27/112; B01F 27/806; B01F 33/81; B01F 35/21112; B01F 35/2112; B01F 35/2203;
(Continued)

(56) References Cited

U.S. PATENT DOCUMENTS 2,324,593 A * 7/1943 Persson ........... B01F 23/232111
                                                    210/626

FOREIGN PATENT DOCUMENTS

CN            105771751 A * 7/2016

OTHER PUBLICATIONS

Google machine translation for "CN-105771751-A" (Year: 2016).*

* cited by examiner

*Primary Examiner* — Anshu Bhatia

(57) ABSTRACT

Disclosed is a device and method for preparing composite ice glaze, relating to the field of freshness of aquatic products. The device includes a frame portion, a mother liquid preparation portion, an ice glaze preparation portion, an ice glaze post-processing portion and a controller system; the frame portion includes a shell, a base, and a thermal insulation baffles; the mother liquid preparation portion includes a main water inlet pipe, a water storage tank, mother liquid tanks; the ice glaze preparation portion includes a homogenizing tank, a homogenizing tank inlet pipe, a waste cylinder inlet pipe; the ice glaze post-processing portion includes a reception cylinder, and a waste cylinder. The device provided by the invention is simple to use, and the prepared concentration is accurate and effective, so that the compounding process can be simplified and the compounding efficiency is effectively improved.

12 Claims, 2 Drawing Sheets

(51) Int. Cl.
    *A23B 4/26*     (2006.01)
    *B01F 35/21*     (2022.01)
    *B01F 35/22*     (2022.01)
    *B01F 33/81*     (2022.01)
    *B01F 27/05*     (2022.01)
    *B01F 27/806*     (2022.01)
    *B01F 27/072*     (2022.01)
    *B01F 27/112*     (2022.01)
    *F25C 1/00*     (2006.01)

(52) U.S. Cl.
    CPC ...... *B01F 35/2203* (2022.01); *B01F 35/2209* (2022.01); *F25C 1/00* (2013.01); *A23V 2002/00* (2013.01); *F25C 2301/002* (2013.01); *F25C 2400/12* (2013.01)

(58) Field of Classification Search
    CPC .. B01F 35/2009; F25C 1/00; F25C 2301/002; F25C 2400/12
    See application file for complete search history.

DEVICE AND METHOD OF PREPARING COMPOSITE ICE GLAZE

CROSS-REFERENCE TO RELATED APPLICATIONS

This application claims priority from Chinese Patent Application No. 201910780365.3, submitted to Patent Office of the People's Republic of China, filed on 8, Aug. 2019 and entitled by "Device and Method of Preparing Composite Ice Glaze", the entire contents of which are incorporated by reference in the present application.

FIELD OF TECHNOLOGY

The present disclosure relates to aquatic fresh-keeping field, in particular, to a device and method of preparing composite ice glaze.

BACKGROUND

After being caught, the seawater fish have to be subjected to cold preservation quick-freezing. During the cold preservation, the surface of the fish is in contact with the air, which is prone to oxidation and quality fission. For example, tuna meat is delicious, nutritious, and has high commercial value. Fresh tuna requires cryopreservation, and during the cold preservation, the surface of the fish is in contact with the air, which is prone to oxidation and quality fission, leading to great reduction in its commercial value. Glazing can make the fatty acids, proteins and other substances in the tuna muscles difficult to be exposed to the outside, so as to slow down the tuna's corruption and dry consumption. At present, the composition of the ice glaze used for the glazing of the tuna is single, and has limited fresh-keeping effects, while employing compounded ice glaze can greatly improve the preservation effects of glazing processing. Since composition and concentration have a big effect to the compounded ice glaze, and preparation process is very complex, there is a need to provide a device and method for preparing compounded ice glaze, which is simple, practical and accurate in concentration.

SUMMARY

An object of the disclosure is to provide a device and method for preparing compounded ice glaze, to solve the problem of time-consuming and labor-consuming in preparation of different concentrations of compounded ice glaze, wherein the device is simple and practical to use, and the prepared concentration is accurate and effective; the compounding process is simplified, which may effectively improve the compounding efficiency. Currently, there is no device for compounding such compounded ice glaze.

In order to achieve above object, the disclosure provides a device for compounding composite ice glaze including a frame portion, a mother liquid preparation portion, an ice glaze preparation portion, an ice glaze post-processing portion and a controller system.

The frame portion includes a shell, a base for supporting the shell, and thermal insulation baffles.

The mother liquid preparation portion includes a main water inlet pipe, a water storage tank water inlet electromagnetic valve, a water storage tank, a first mother liquid tank, a second mother liquid tank, a third mother liquid tank, and a fourth mother liquid tank, each of the mother liquid tanks configured with a blending mechanism and a mother liquid tank water inlet pipe connected to the water storage tank.

The ice glaze preparation portion includes a homogenizing tank configured with a homogenizing tank blender, a homogenizing tank inlet pipe for providing a fluid from the mother liquid tank into the homogenizing tank, a homogenizing tank inlet electromagnetic valve, a waste cylinder inlet pipe for discharging the fluid in the homogenizing tank, and a waste cylinder inlet electromagnetic valve.

The ice glaze post-processing portion comprises a reception cylinder connected to the homogenizing tank, a waste cylinder connected to the homogenizing tank and each of the mother liquid tanks, a reception cylinder inlet pipe for providing the fluid in the homogenizing tank to the reception cylinder, a reception cylinder inlet flowmeter and a reception cylinder electromagnetic valve.

An embodiment of the disclosure provides a compounding device for preparing composite ice glaze including a frame portion, a mother liquid preparation portion, an ice glaze preparation portion, an ice glaze post-processing portion and a controller system.

The frame portion comprises a shell, a base for supporting the shell, and thermal insulation baffles dividing the shell into a four-layer space from up to down.

The mother liquid preparation portion includes a main water inlet pipe located in a top space of the shell; a water storage tank water inlet electromagnetic valve; a water storage tank located in a top space of the shell and connected to the main water inlet pipe; and a first mother liquid tank, a second mother liquid tank, a third mother liquid tank and a fourth mother liquid tank that are located in a 2nd space of the shell (1) and connected in parallel to each other by a mother liquid tank water inlet pipe which also connects to the water storage tank respectively, each of the mother liquid tanks configured with a blending mechanism.

The ice glaze preparation portion includes a homogenizing tank located in a 3rd space of the shell and configured with a homogenizing tank blender, a homogenizing tank inlet pipe connected below each of the mother liquid tanks and for providing a fluid in the mother liquid tank to the homogenizing tank, a homogenizing tank inlet flowmeter, a homogenizing tank inlet electromagnetic valve, a waste cylinder inlet pipe connected below each of the mother liquid tank and for discharging the fluid in the homogenizing tank, and a waste cylinder inlet electromagnetic valve.

The ice glaze post-processing portion includes a reception cylinder in a bottom space of the shell and connected to the homogenizing tank, a waste cylinder connected to the homogenizing tank through a homogenizing tank discharging pipe and connected to each of the mother liquid tanks through the waste cylinder inlet pipe, a reception cylinder inlet pipe for providing the fluid in the homogenizing tank to the reception cylinder, a reception cylinder inlet flowmeter, and a reception cylinder electromagnetic valve.

The controller system is connected communicatively to the electromagnetic valves, the flowmeters, the blending mechanisms, and the blenders.

The flowmeter is configured to monitor the flow of the corresponding water inlet pipe or inlet pipe, and the electromagnetic valve is configured to control the opening or closing of the corresponding water inlet pipe or inlet pipe.

In an embodiment, the water storage tank is mounted with the water storage tank water inlet electromagnetic valve.

In an embodiment, the mother liquid tank water inlet pipe is mounted with a mother liquid tank inlet flowmeter and a mother liquid tank inlet electromagnetic valve, the four mother liquid tanks connected in parallel are connected to the water storage tank through the corresponding mother liquid tank water inlet pipes, and each of the mother liquid tank water inlet pipes is mounted with a mother liquid tank inlet flowmeter and a mother liquid tank inlet electromagnetic valve. The flowmeter is configured to monitor the flow of the corresponding water inlet pipe, and the electromagnetic valve is configured to control the opening or closing of the corresponding water inlet pipe.

In an embodiment, the homogenizing tank water inlet pipe is mounted with a homogenizing tank inlet flowmeter and a homogenizing tank inlet electromagnetic valve.

In an embodiment, the mother liquid tank is connected to the homogenizing tank through the homogenizing tank inlet pipe, and to the waste cylinder by connecting to a sewage pipe through the waste cylinder inlet pipe, each waste cylinder inlet pipe provided with a waste cylinder electromagnetic valve.

In an embodiment, the homogenizing tank has a left side provided with a power supply apparatus, a right side provided with the controller system, and a lower part provided with the reception cylinder; each of the mother liquid tanks is connected to the sewage pipe through the waste cylinder inlet pipe, so as to discharge waste solution to the waste cylinder.

In an embodiment, the homogenizing tank is connected to the sewage pipe through the homogenizing tank discharging pipe, and the homogenizing tank discharging pipe is provided with a homogenizing tank discharging electromagnetic valve. The homogenizing tank is connected to the reception cylinder through the reception cylinder inlet pipe, and the reception cylinder inlet pipe is provided with a reception cylinder inlet flowmeter and a reception cylinder inlet electromagnetic valve.

In an embodiment, all of the water inlet pipes, the inlet pipes and the discharging pipes are mounted with a electromagnetic valve, and the electromagnetic valves are controlled by the controller system through flow and liquid level signals. A bottom of the mother liquid tank is provided with a temperature control system, and the temperature control system is controlled by the controller system.

In an embodiment, the shell is above the base, and separated into different chambers by the thermal insulation baffles, wherein a top-layer middle chamber comprises the water storage tank built inside, and the water storage tank has an upper part connected to the main water inlet pipe and a lower part connected to the four mother liquid tanks connected in parallel via the mother liquid tank water inlet pipes. A second layer has left and right sides respectively distributed with two thermal insulation chambers, which are stored respectively with the first mother liquid tank, the second mother liquid tank, the third mother liquid tank and the fourth mother liquid tank; the chambers where the mother liquid tanks are located have an inner wall provided with thermal insulation material, and the controller system keeps a temperature of the chamber constant according to a set value of the temperature. The third layer has a middle chamber built inside with the homogenizing tanks, and the homogenizing tanks has an upper part connected to the homogenizing tank inlet pipe, a lower right side connected to the reception cylinder inlet pipe and a lower left side connected to the waste cylinder inlet pipe; a bottom-layer chamber has a left side built inside with the waste cylinder, and a right side built inside with the reception cylinder.

In an embodiment, the blending mechanisms of the mother liquid tanks are in respective upper chamber of the corresponding mother liquid tanks; the blending mechanism includes a fixed bracket, a lifting gear mechanism, a driving motor, a blending link and a blending blade; the fixed bracket is fixedly connected to a side wall of the chamber, and the lifting gear mechanism drives the blending link to perform a lifting movement in a vertical direction; a mother liquid tank cover is fixedly mounted below the blending link and above the blending blade, the mother liquid tank water inlet pipe includes a telescopic hose and a water delivery pipe, and the telescopic hose penetrates through the mother liquid tank cover; the telescopic hose is connected to the water storage tank through the water delivery pipe.

In an embodiment, the blending mechanism is disposed above the mother liquid tank, and the homogenizing tank blender is disposed above the homogenizing tank, wherein the blending mechanism and the homogenizing tank blender are controlled by the controller system.

In an embodiment, the blending link of the blending mechanism above the mother liquid tank may perform a lifting movement in a vertical direction under the action of the lifting gear mechanism, and a length of the telescopic hose is determined according to a movement amplitude of the blending mechanism.

In an embodiment, the cover of the mother liquid tank is fixedly connected to the blending link, with a lifting controlled by the lifting of the blending mechanism.

In an embodiment, the chambers where the mother liquid tanks are located have a front surface provided with a movable door, and the movable door is controlled by the controller system.

In an embodiment, the waste cylinder and the reception cylinder are made of glass, and the chambers in which the waste cylinder and the reception cylinder are located are open for accessing at any time.

In an embodiment, the mother liquid tank, the water storage tank, the water inlet pipe, the inlet pipe, and the discharging pipe are made of PPR.

PP-R is also called three-type polypropylene pipe, random copolymerized polypropylene, which adopts random copolymerized polypropylene to be extruded into pipes and injection-molded into pipe fittings. The polypropylene random copolymer is also a kind of polypropylene, and the basic structure of its polymer chain is modified by adding different kinds of monomers. Ethylene is the most commonly used monomer and it causes changes in the physical properties of polypropylene. Compared with pp homopolymers, random copolymers have improved optical properties (increased transparency and reduced haze), improved impact resistance, increased flexibility, reduced melting temperature, and thus reduced thermal fusion. At the same time, it is basically the same as homopolymer in terms of chemical stability, water vapor barrier properties and organoleptic properties (low odor and taste). They are used in the fields of blow molding, injection molding, film and sheet extrusion processing, as food packaging materials, pharmaceutical packaging materials and daily consumer goods. PPR has good toughness, high strength, excellent processability, good creep resistance at higher temperatures, and has the advantages of high transparency.

In an embodiment, the water storage tank is provided with a liquid level sensor, and the controller system may automatically open the electromagnetic valve to replenish the amount of water when detecting that a water level in the water storage tank is below a minimum level.

In an embodiment, when a liquid level of the mother liquid in the mother liquid tank is lower than the minimum level, the system will automatically alarm and prompt, then the mother liquid is re-prepared as required.

In an embodiment, after the ice glaze is prepared, a cleaning program is initiated to clean the mother liquid tank with the water in the water storage tank, and discharge into the waste cylinder through the waste cylinder discharge pipe.

The present disclosure further provides a method for preparing compounded ice glaze using the above compounding device, including steps of:

(1) setting type, concentration, and volume of mother liquids of ice glaze, and calculating, by a system, the amount of reagents to be added;

(2) setting type, concentration, and time for uniformly mixing of a compounded ice glaze;

(3) matching a mother liquid tank for the mother liquids of ice glaze, setting a bleeding speed and temperature of the mother liquid tank;

(3) adding the corresponding amount of reagent to the corresponding mother liquid tank;

(4) opening the mother liquid tank water inlet pipes, by the controller system, according to the set type, the set concentration, and the set volume of the ice glaze, to prepare the mother liquids of the ice glaze in the mother liquid tank;

(5) opening the homogenizing tank inlet pipes, by the controller system, according to the set type and the set concentration of the compounded ice glaze after the mother liquid is prepared to compound the compounded ice glaze in the homogenizing tank, and then receiving the compounded ice glaze, by the reception cylinder, after the compounded ice glaze is prepared;

(6) after the compounding process is completed, initiating the cleaning program, and opening the mother liquid tank water inlet pipes, the homogenizing tank inlet pipes, the homogenizing tank discharging pipe and the waste tank inlet pips, to clean the device.

A prepared concentration of the mother liquid of the ice glaze should be higher than a concentration of the component in the compounded ice glaze.

The mother liquids of ice glaze should have stable properties and is non-corrosive to the mother liquid tank.

The reagents added to the mother liquid tank should be accurately weighed according to calculation results of the system.

In one embodiment, the shell of the compounding device for compounded ice glaze is made of metal material, and the inside and the partition are provided with an EPS material thermal insulation layer.

In one embodiment, the mother liquid tank and the homogenizing tank are made of PPR material, and the waste cylinder and the reception cylinder are made of glass material.

In one embodiment, a temperature sensor and a temperature control system are arranged in the chambers where the mother liquid tanks are located, with a temperature range of −10° C. to 50° C.

In one embodiment, a ring-shaped fixed bracket is fixed on the top of the blending mechanism, and the controller system controls the lifting gear to adjust the lifting.

In one embodiment, the water storage tank, the mother liquid tank, the homogenizing tank and the waste cylinder all have a cylindrical structure, and the liquid reception tank has a cubic structure.

In one embodiment, the glazing mother liquid mainly includes a rosemary ice glaze, sodium lactate ice glaze and bamboo leaf antioxidant ice glaze, wherein the concentration of the mother liquid is higher than that in the compounded ice glaze, and the volume of the mother liquid is determined as required.

In one embodiment, the compounding for ice glaze should have an addition of thickener, and the thickener is used as one member of the mother liquids for preparing compounded ice glaze.

In one embodiment, when compounded ice glazes with different concentrations are prepared, an intake pipe of the homogenizing tank for connecting the homogenizing tank to the water storage tank is opened to clean the homogenizing tank and the blending blade, and then the homogenizing tank discharge electromagnetic valve is opened to discharge the waste to the waste cylinder after cleaning.

In one embodiment, a plurality of reception cylinders is configured to carry the compounded ice glazes with different concentrations.

In one embodiment, when the volume of the mother liquid is insufficient, reagents are added according to the results of system calculations to supplement the mother liquid.

In the technical solution provided by the disclosure, the device is simple to use, and the prepared concentration is accurate and effective, so that the compounding process may be simplified and the compounding efficiency is effectively improved.

Among them, 1 shell, 2 base, 3 thermal insulation baffle, 4 main water inlet pipe, 5 water storage tank water inlet electromagnetic valve, 6 water storage tank, 7 first mother liquid tank, 8 second mother liquid tank, 9 third mother liquid tank, 10 fourth mother liquid tank, 11 fixed bracket, 12 lifting gear mechanism, 13 drive motor, 14 blending blade, 15 mother liquid tank cover, 16 telescopic hose, 17 water delivery pipe, 18 mother liquid tank inlet flowmeter, 19 temperature control system, 20 homogenizing tank, 21 power supply apparatus, 22 controller system, 23 sewage pipe, 24 waste cylinder, 25 reception cylinder, 26 mother liquid tank inlet electromagnetic valve, 27 homogenizing tank inlet flowmeter, 28 homogenizing tank inlet electromagnetic valve, 29 waste pipe inlet electromagnetic valve, 30 liquid reception inlet flowmeter, 31 liquid reception inlet electromagnetic valve, 32 homogenizing tank blending blade, 33 liquid level sensor, 34 homogenizing tank discharge electromagnetic valve, 40 blending link, 42 homogenizing tank inlet pipe.

Figure 2:
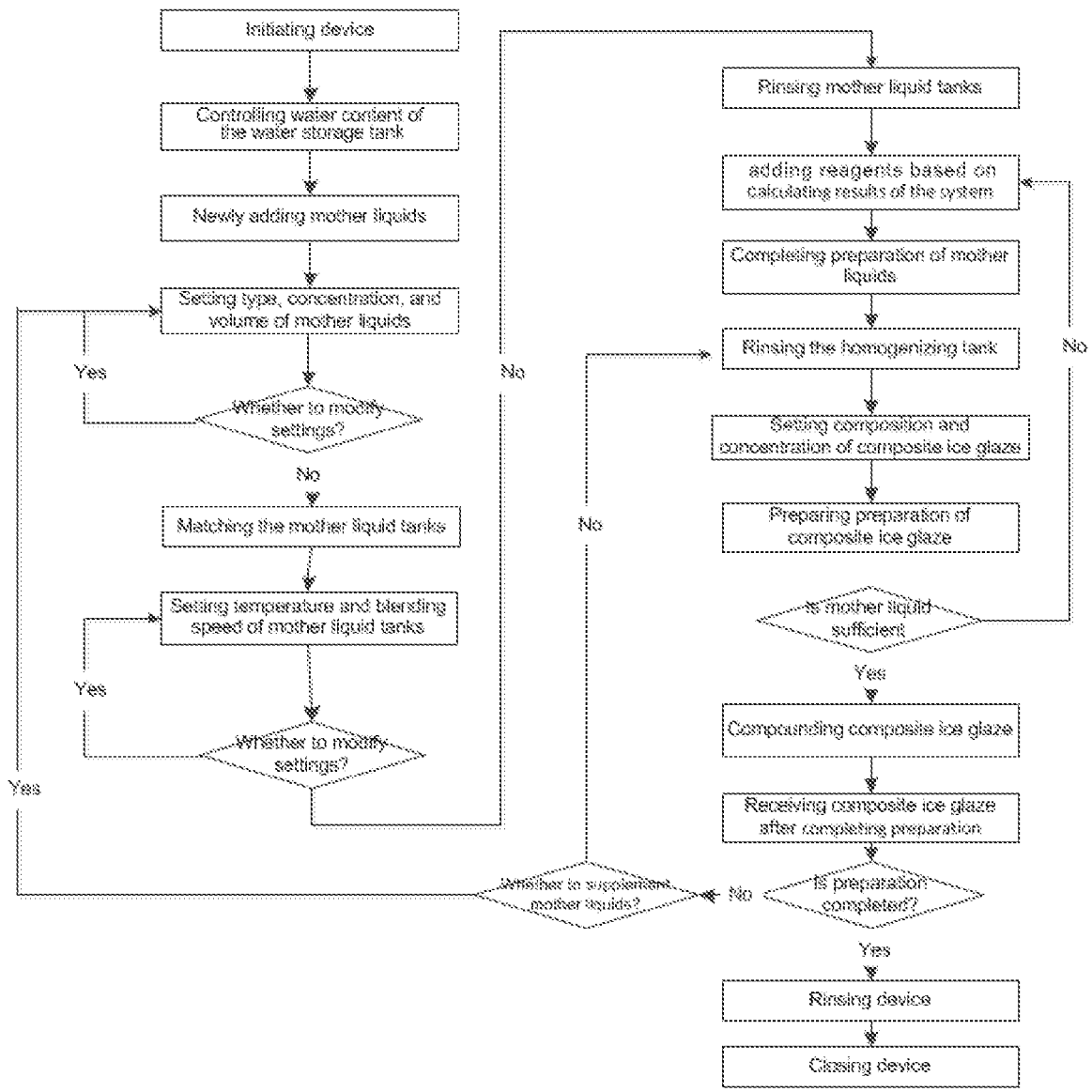

FIG. 2 is a flow chart of a method for preparing compounded ice glaze of the disclosure.

DESCRIPTION OF THE EMBODIMENTS

Implementations of the present disclosure will be further described in detail with reference to the accompanying drawings and taking specific embodiments as examples.

Figure 1:
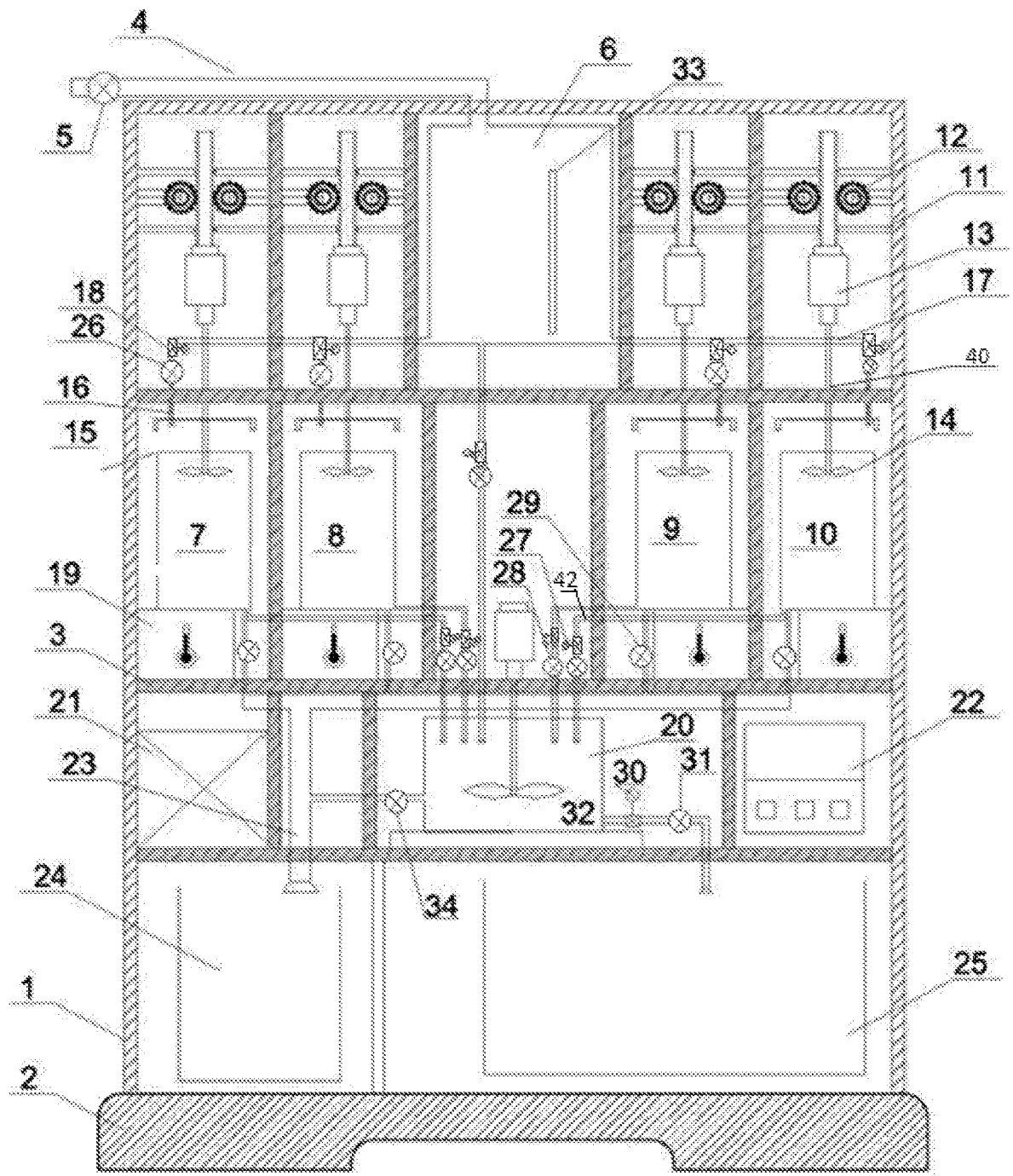
FIG. 1 is a diagram showing a structure of a compounding device for compounded ice glaze in an embodiment of the disclosure.

FIG. 1 illustrates an embodiment of a compounding device for compounded ice glaze of the present disclosure, and FIG. 2 illustrates an embodiment of a compounding process for compounded ice glaze of the present disclosure.

As shown in FIG. 1, the device of the present disclosure includes a frame portion, a mother liquid preparation portion, an ice glaze preparation portion, an ice glaze post-processing portion and a controller system.

The frame portion includes a shell 1, a base 2, and a thermal insulation partition 3.

The mother liquid preparation portion comprises a main water inlet pipe 4, a water storage tank water inlet electromagnetic valve 5, a water storage tank 6, a first mother liquid tank 7, a second mother liquid tank 8, a third mother liquid tank 9, and a fourth mother liquid tank 10, each of the mother liquid tanks configured with a blending mechanism and a water feeding mechanism.

The ice glaze preparation portion includes a homogenizing tank 20, a homogenizing tank inlet pipe 42, a homogenizing tank inlet electromagnetic valve 28, a waste cylinder inlet electromagnetic valve 29, a homogenizing tank blending blade 32; the ice glaze post-processing portion includes a reception cylinder 25, a waste cylinder 24, a liquid reception inlet flowmeter 30, and a reception cylinder electromagnetic valve 31.

The water storage tank 6 is mounted with the water storage tank water inlet electromagnetic valve 5.

The mother liquid tank water inlet mechanism may include the mother liquid tank water inlet pipe, a mother liquid tank inlet flowmeter 18 and a mother liquid tank inlet electromagnetic valve 26.

Each of the mother liquid tanks that are connected in parallel is connected to the water storage tank 6 through one mother liquid tank water inlet pipe respectively, and each mother liquid tank water inlet pipe is mounted with the mother liquid tank inlet flowmeter 18 and the mother liquid tank inlet electromagnetic valve 26.

Each of the mother liquid tanks that are connected in parallel is connected to the homogenizing tank 20 through one homogenizing tank inlet pipe respectively, and each homogenizing tank inlet pipe is mounted with a homogenizing tank inlet flowmeter 27 and a homogenizing tank inlet electromagnetic valve 28.

Each of the mother liquid tanks that are connected in parallel is connected to the waster cylinder by connecting to a sewage pipe (23) through one waste cylinder inlet pipe, and each waste cylinder inlet pipe is provided with one waste cylinder electromagnetic valve (29).

The homogenizing tank has a left side provided with a power supply apparatus 21, a right side provided with a controller system 22, and a lower part provided with the reception cylinder 25; each of the mother liquid tanks is connected to the sewage pipe 23 through one waste cylinder inlet pipe, so as to discharge a waste solution to the waste cylinder 24.

The homogenizing tank 20 is connected to the sewage pipe 23 through the homogenizing tank discharging pipe, and the homogenizing tank discharging pipe is provided with a homogenizing tank discharging electromagnetic valve 34. The homogenizing tank has an intake pipe which supplies the fluid in the mother liquid tanks to the homogenizing tank.

The electromagnetic valves are controlled by the controller system 22 through flow and liquid level signals, so as to open or close respective water inlet pipes and inlet pipes. A bottom of the mother liquid tank is provided with a temperature control system 19, and the temperature control system 19 is controlled by the controller system 22.

The shell 1 is above the base 2, and divided into a four-layer space to form different chambers by the thermal insulation baffles from bottom to top, wherein a top-layer middle chamber comprises the water storage tank 6 built inside, with a lower part connected to the mother liquid tank water inlet pipe. A second-layer chamber has left and right sides respectively distributed with two thermal insulation chambers, which are stored respectively with the first mother liquid tank 7, the second mother liquid tank 8, the third mother liquid tank 9 and the fourth mother liquid tank 10 that are connected in parallel and are connected below the water storage tank through one water inlet pipe respectively; each of the chambers where the mother liquid tanks are located has an inner wall provided with thermal insulation material, and the controller system 22 keeps a temperature of the chamber constant according to a set value of the temperature.

The chamber above the mother liquid tanks is correspondingly mounted with the blending mechanism; the blending mechanism comprises a fixed bracket 11, a lifting gear mechanism 12, a driving motor 13, a blending link and a blending blade 14; a mother liquid tank cover 15 is fixedly mounted under the blending mechanism, as shown, mounted below the blending link and above the blending blade, the telescopic hose 16 penetrates through the mother liquid tank cover; the telescopic hose is connected to the water storage tank 6 through the water delivery pipe 17.

The blending mechanism is disposed above the mother liquid tank and the homogenizing tank, wherein the blending mechanism is controlled by the controller system.

The blending mechanism above the mother liquid tank may perform vertical movement by the lifting gear mechanism, as shown, and the blending link may perform a lifting movement in a vertical direction under the action of the lifting gear mechanism to drive the blending mechanism to perform lifting movement in the vertical direction; a length of the telescopic hose is determined according to a movement amplitude of the blending mechanism.

The mother liquid tank cover is fixedly connected to the blending link, with a lifting controlled by the lifting of the blending mechanism.

The chambers where the mother liquid tank is located have a front surface provided with a movable door, and the movable door is controlled by the controller system.

The waste cylinder and the reception cylinder are made of glass, and the chambers in which the waste cylinder and the reception cylinder are located are open for accessing at any time.

The mother liquid tank, the water storage tank, the water inlet pipe, the inlet pipe, and the water delivery pipe are made of PPR.

The water storage tank 6 is provided with a liquid level sensor 33, and the controller system may automatically open the electromagnetic valve 5 to replenish the amount of water when detecting that a water level in the water storage tank is below a minimum level.

When a liquid level of the mother liquid in the mother liquid tank is lower than the minimum level, the system will automatically alarm and prompt, then the mother liquid is re-prepared as required.

After the ice glaze is prepared, a cleaning program is initiated to clean the mother liquid tank with the water in the water storage tank, and discharge into the waste cylinder through the water delivery pipe.

The following uses tuna ice glaze as an example to describe the use of the compounding device for ice glaze provided by the present disclosure.

According to literature analysis, the use of rosemary glazing emulsion, sodium lactate glazing emulsion and bamboo leaf antioxidant glazing emulsion is determined, and sodium carboxymethyl cellulose is used as a thickener to prevent glazing from cracking.

Based on pre-experimental analysis, rosemary ice glaze (0.1%, 0.2%, 0.3%, 0.4%), sodium lactate solution (1%, 2%, 3%, 4%) and bamboo leaf antioxidant (0.1%, 0.2%, 0.3%, 0.4%) are prepared respectively for single glazing test. 1% thickener is added for each group.

As shown in FIG. 2, the preparation is performed by steps of:

(1) setting type, concentration, and volume of mother liquids of ice glaze, and calculating, by a system, the amount of reagents to be added;

(2) setting type, concentration, and time for uniformly mixing of a compounded ice glaze;

(3) matching a mother liquid tank for the mother liquids of ice glaze, setting bleeding speed and temperature of the mother liquid tank;

(3) initiating the lifting gear mechanism to raise the mother liquid tank cover upward, adding reagents with corresponding amount to the respective mother liquid tanks, and then initiating the lifting gear mechanism to lower the mother liquid tank cover down ward after the reagents are added;

(4) opening the mother liquid tank water inlet pipe according to the set type, the set concentration, and the set volume of the mother liquid for starting preparation of the mother liquid of the ice glaze in the mother liquid tank;

(5) opening the homogenizing tank inlet pipe according to the set type and the set concentration of the compounded ice glaze after the mother liquid is prepared to compound the compounded ice glaze in the homogenizing tank, and then receiving the compounded ice glaze, by the reception cylinder, after the compounded ice glaze is prepared;

(6) after the test is completed, initiating the cleaning program, and opening the mother liquid tank water inlet pipe, the homogenizing tank inlet pipe, the homogenizing tank discharging pipe and the waste tank inlet pip, to clean the device.

According to the results of the single factor test, the mass fractions of rosemary acid ice glaze, sodium lactate ice glaze, and bamboo leaf antioxidant ice glaze are taken as the independent variables, and total scores of water holding capacity, color difference value, and salt-soluble protein are used as response values, to perform a three-factor three-level response surface test, and verify the test results.

According to the results of the single factor test, the principle of Box-Behnken Design is used, the three-factor three-level response surface methodology is employed to design the test, and Design-Expert 10.0.7 is used to generate a total of 17 test points, that is, 17 compounding test solutions. First, 17 groups of compounded ice-coating liquids are prepared according to the steps of:

(1) setting type, concentration, and volume of mother liquids of ice glaze, and calculating, by a system, the amount of reagents to be added;

(2) setting type, concentration, and time for uniformly mixing of a compounded ice-coating liquid;

(3) matching a mother liquid tank for the mother liquids of ice glaze, setting bleeding speed and temperature of the mother liquid tank;

(3) initiating a lifting gear mechanism to raise the cover of mother liquid tank upward, adding reagents with corresponding amount to the respective mother liquid tanks, and then initiating the lifting gear mechanism to lower the cover of the mother liquid tank down ward after the reagents are added;

(4) opening the mother liquid tank water inlet pipe according to the set type, the set concentration, and the set volume of the ice glaze for starting preparation of the mother liquid of the ice glaze in the mother liquid tank;

(5) opening each of the homogenizing tank inlet pipes according to the set type and the set concentration of the compounded ice glaze after the mother liquid is prepared to compound the compounded ice glaze in the homogenizing tank, and then receiving the compounded ice glaze, by the reception cylinder, after the compounded ice glaze is prepared, thereby completing one group of compounded ice glaze;

(6) controlling each of the homogenizing tank inlet pipes to repeat the step (5) according to the set type and the set concentration of the compounded ice glaze, for completing next group of compounded ice glaze until 17 groups of compounded ice glazes are completed;

(7) after the compounding process is completed, initiating the cleaning program, and opening the mother liquid tank water inlet pipe, the homogenizing tank inlet pipe, the homogenizing tank discharging pipe and the waste tank inlet pipe, to clean the device.

A prepared concentration of the mother liquid of ice glaze should be higher than a concentration of the component in the compounded ice glaze;

The mother liquids of ice glaze should have stable properties and are non-corrosive to the mother liquid tank.

The reagent added to the mother liquid tank should be accurately weighed according to calculation results of the system.

Through the analysis of the test, the optimal ratio of compounded ice glaze is: rosemary (0.3%), sodium lactate (3.4%), bamboo leaf antioxidants (0.12%) and sodium carboxymethyl cellulose (1%), and then the tuna compounded glazing has the best effect, with a predicted score of 21.19 points.

It can be seen from the above description of the specific embodiments of the present disclosure that the simple structure and effective method of the present disclosure may meet the requirements for the compounded ice glazes with different concentrations and components, and improve the efficiency of the compounding. Currently, there is no compounding device for ice glaze.

The above-mentioned embodiments only express several implementation manners of the present disclosure, and their descriptions are more specific and detailed, but they cannot be understood as limiting the scope of the patent of the present disclosure. It should be pointed out those of ordinary skill in the art may further make a plurality of variations and improvements without departing from the concept of the present invention, and these all pertain to the protection scope of the present invention. Therefore, the protection scope of the claims shall prevail as the protection scope of the present invention.

What is claimed is:

1. A device for preparing composite ice glaze, wherein the device comprises a frame portion, a mother liquid preparation portion, an ice glaze preparation portion, an ice glaze post-processing portion and a controller system;

the frame portion comprises a shell (1), a base (2) for supporting the shell (1), and thermal insulation baffles (3);

the mother liquid preparation portion comprises a main water inlet pipe (4), a water storage tank water inlet electromagnetic valve (5), a water storage tank (6), a first mother liquid tank (7), a second mother liquid tank (8), a third mother liquid tank (9), and a fourth mother liquid tank (10), each of the mother liquid tanks configured with a mixer and a mother liquid tank water inlet pipe connected to the water storage tank (6);

the ice glaze preparation portion comprises a homogenizing tank (20) configured with a homogenizing tank blender (32), a homogenizing tank inlet pipe (42) for providing a fluid in the mother liquid tank to the homogenizing tank, a homogenizing tank inlet electromagnetic valve (28), a waste cylinder inlet pipe for discharging the fluid in the homogenizing tank, and a waste cylinder inlet electromagnetic valve (29);

the ice glaze post-processing portion comprises a reception cylinder (25) connected to the homogenizing tank (20), a waste cylinder (24) connected to the homogenizing tank (20) and each of the mother liquid tanks, a reception cylinder inlet pipe for providing the fluid in the homogenizing tank (20) to the reception cylinder, a reception cylinder inlet flowmeter (30), and a reception cylinder electromagnetic valve (31).

2. The device for preparing composite ice glaze according to claim 1, wherein the thermal insulation baffles (3) divides the shell (1) into a four-layer space from bottom to top; the mother liquid preparation portion comprises a main water inlet pipe (4); a water storage tank water inlet electromagnetic valve (5); a water storage tank (6) located in a top space of the shell and connected to the main water inlet pipe; and a first mother liquid tank (7), a second mother liquid tank (8), a third mother liquid tank (9) and a fourth mother liquid tank (10) that are located in a 2nd space of the shell (1) and connected in parallel to each other by a mother liquid tank water inlet pipe which also connecting to the water storage tank respectively;

the ice glaze preparation portion comprises a homogenizing tank (20) in a $3^{rd}$ space of the shell, a homogenizing tank inlet pipe connected below each of the mother liquid tanks and for providing a fluid in the mother liquid tank to the homogenizing tank inlet pipe (42), a homogenizing tank inlet flowmeter (27), a homogenizing tank inlet electromagnetic valve (28), a waste cylinder inlet pipe connected below each of the mother liquid tanks;

the ice glaze post-processing portion comprises a reception cylinder (25) in a bottom space of the shell and connected to the homogenizing tank (20), a waste cylinder (24) connected to the homogenizing tank (20) through a homogenizing tank discharging pipe and connected to each of the mother liquid tanks through the waste cylinder inlet pipe;

the controller system is connected communicatively to the electromagnetic valves, the flowmeters, the mixers, and the blenders.

3. The device for preparing composite ice glaze according to claim 2, wherein the water storage tank is mounted with the water storage tank water inlet electromagnetic valve (5);

each of the mother liquid tank water inlet pipes is mounted with a mother liquid tank inlet flowmeter (18) and a mother liquid tank inlet electromagnetic valve (26);

the homogenizing tank inlet pipe is mounted with a homogenizing tank inlet flowmeter (27) and a homogenizing tank inlet electromagnetic valve (28);

each of the mother liquid tanks is connected to the homogenizing tank (20) through the homogenizing tank inlet pipe, and to the waste cylinder by connecting to a sewage pipe (23) through the waste cylinder inlet pipe, each waste cylinder inlet pipe provided with one waste cylinder electromagnetic valve (29);

the homogenizing tank has a left side provided with a power supply apparatus (21), a right side provided with the controller system (22), and a lower part provided with the reception cylinder (25); each of the mother liquid tanks is connected to the sewage pipe (23) through the waste cylinder inlet pipe, so as to discharge a waste solution to the waste cylinder (24);

the homogenizing tank (20) is connected to the sewage pipe (23) through the homogenizing tank discharging pipe, and the homogenizing tank discharging pipe is provided with a homogenizing tank discharging electromagnetic valve (34);

the mother liquid tank water inlet pipe, the homogenizing tank inlet pipe, the waste cylinder inlet pipe, and the reception cylinder inlet pipe are mounted with the electromagnetic valves, and the electromagnetic valves are controlled by the controller system (22) through flow and liquid level signals;

a bottom of the mother liquid tank is provided with a temperature control system (19), and the temperature control system (19) is controlled by the controller system (22).

4. The device for preparing composite ice glaze according to claim 2, wherein the shell (1) is above the base (2), and separated into different chambers by the thermal insulation baffles, wherein a top-layer middle chamber comprises the water storage tank (6) built inside, and the water storage tank has an upper part connected to the main water inlet pipe and a lower part connected to the mother liquid tank water inlet pipe;

a second layer has left and right sides respectively distributed with two thermal insulation chambers, which are stored respectively with the first mother liquid tank (7), the second mother liquid tank (8), the third mother liquid tank (9) and the fourth mother liquid tank (10);

each of the chambers where the mother liquid tank is located has an inner wall provided with thermal insulation material, and the controller system (22) keeps a temperature of the chamber constant according to a set value of the temperature;

the third layer has a middle chamber comprising the homogenizing tank built inside, and the homogenizing tank has an upper part connected to the homogenizing tank inlet pipe, a lower right side connected to the reception cylinder inlet pipe and a lower left side connected to the waste cylinder inlet pipe;

a bottom-layer chamber has a left side with the waste cylinder built inside, and a right side with the reception cylinder built inside.

5. The device for preparing composite ice glaze according to claim 1, wherein the water storage tank is mounted with the water storage tank water inlet electromagnetic valve (5);

each of the mother liquid tank water inlet pipes is mounted with a mother liquid tank inlet flowmeter (18) and a mother liquid tank inlet electromagnetic valve (26);

the homogenizing tank inlet pipe is mounted with a homogenizing tank inlet flowmeter (27) and a homogenizing tank inlet electromagnetic valve (28);

each of the mother liquid tanks is connected to the homogenizing tank (20) through the homogenizing tank inlet pipe, and to the waste cylinder by connecting to a sewage pipe (23) through the waste cylinder inlet pipe, each waste cylinder inlet pipe provided with one waste cylinder electromagnetic valve (29);

the homogenizing tank has a left side provided with a power supply apparatus (21), a right side provided with the controller system (22), and a lower part provided with the reception cylinder (25); each of the mother liquid tanks is connected to the sewage pipe (23)

through the waste cylinder inlet pipe, so as to discharge a waste solution to the waste cylinder (24);

the homogenizing tank (20) is connected to the sewage pipe (23) through the homogenizing tank discharging pipe, and the homogenizing tank discharging pipe is provided with a homogenizing tank discharging electromagnetic valve (34);

the mother liquid tank water inlet pipe, the homogenizing tank inlet pipe, the waste cylinder inlet pipe, and the reception cylinder inlet pipe are mounted with the electromagnetic valves, and the electromagnetic valves are controlled by the controller system (22) through flow and liquid level signals;

a bottom of the mother liquid tank is provided with a temperature control system (19), and the temperature control system (19) is controlled by the controller system (22).

6. The device for preparing composite ice glaze according to claim 1, wherein the shell (1) is above the base (2), and separated into different chambers by the thermal insulation baffles, wherein a top-layer middle chamber comprises the water storage tank (6) built inside, and the water storage tank has an upper part connected to the main water inlet pipe and a lower part connected to the mother liquid tank water inlet pipe;

a second layer has left and right sides respectively distributed with two thermal insulation chambers, which are stored respectively with the first mother liquid tank (7), the second mother liquid tank (8), the third mother liquid tank (9) and the fourth mother liquid tank (10);

each of the chambers where the mother liquid tank is located has an inner wall provided with thermal insulation material, and the controller system (22) keeps a temperature of the chamber constant according to a set value of the temperature;

the third layer has a middle chamber comprising the homogenizing tank built inside, and the homogenizing tank has an upper part connected to the homogenizing tank inlet pipe, a lower right side connected to the reception cylinder inlet pipe and a lower left side connected to the waste cylinder inlet pipe;

a bottom-layer chamber has a left side with the waste cylinder built inside, and a right side with the reception cylinder built inside.

7. The device for preparing composite ice glaze according to claim 6, wherein the mixers of the mother liquid tanks are in respective upper chamber of the corresponding mother liquid tanks; the mixer comprises a fixed bracket (11), a lifting gear mechanism (12), a driving motor (13), a blending link (40) and a blending blade (14); a mother liquid tank cover (15) is fixedly mounted below the blending link and above the blending blade, the mother liquid tank water inlet pipe comprises a telescopic hose (16) and a water delivery pipe (17), and the telescopic hose (16) penetrates through the mother liquid tank cover; the telescopic hose is connected to the water storage tank (6) through the water delivery pipe (17);

the blending mechanism is disposed above the mother liquid tank, and the homogenizing tank blender is disposed above the homogenizing tank, wherein the mixer and the homogenizing tank blender are controlled by the controller system;

the blending link may perform a lifting movement in a vertical direction under the action of the lifting gear mechanism, and a length of the telescopic hose is determined depending on a movement of the mixer;

the mother liquid tank cover is fixedly connected to the blending link, with a lifting controlled by the lifting of the mixer.

8. The device for preparing composite ice glaze according to claim 6, wherein the waste cylinder and the reception cylinder are made of glass, and the chambers in which the waste cylinder and the reception cylinder are located are open;

the mother liquid tanks, the water storage tank, the water inlet pipe, the inlet pipe, and the discharging pipe are made of PPR (Polypropylene-Random).

9. The device for preparing composite ice glaze according to claim 1, wherein the water storage tank (6) is provided with a liquid level sensor (33) for opening water storage tank inlet electromagnetic valve (5) to replenish the amount of water when the controller system detects that a water level in the water storage tank is below a minimum level.

10. The device for preparing composite ice glaze according to claim 1, wherein when a liquid level of the mother liquid in the mother liquid tank is lower than the minimum level, the system will automatically alarm and prompt, then the mother liquid is re-prepared as required;

after the ice glaze is prepared, a cleaning program is initiated to clean the mother liquid tank with the water in the water storage tank, and discharge into the waste cylinder.

11. A method for preparing composite ice glaze using the device according to claim 1, comprising steps of:

(1) setting reagents, concentration, and volume of mother liquids of ice glaze, and calculating, by a system, the amount of reagents to be added;

(2) setting reagents, concentration, and time for uniformly mixing of a composite ice glaze;

(3) matching a mother liquid tank for the mother liquids of ice glaze, setting bleeding speed and temperature of the mother liquid tank;

(3) adding the corresponding amount of reagents to the corresponding mother liquid tank;

(4) opening the mother liquid tank water inlet pipe, by the controller system, according to the set reagents, the set concentration, and the set volume of the mother liquid to run the device for starting preparation of the mother liquid of the ice glaze in the mother liquid tank;

(5) opening the homogenizing tank inlet pipe, by the controller system, according to the set reagents and the set concentration of the composite ice glaze after the mother liquid is prepared to compound the composite ice glaze in the homogenizing tank, and then receiving the composite ice glaze, by the reception cylinder, after the composite ice glaze is prepared;

(6) after the compounding process is completed, initiating the cleaning program, and opening the mother liquid tank water inlet pipe, the homogenizing tank inlet pipe, the homogenizing tank discharging pipe and the waste tank inlet pipe, by the controller system, to clean the device.

12. The method for preparing composite ice glaze according to claim 11, wherein a concentration of one component in the mother liquids is higher than a concentration of the component in the composite ice glaze;

the mother liquids have stable properties and are non-corrosive to the mother liquid tank;

the reagents added to the mother liquid tank are accurately weighed according to calculation results of the controller system.

\* \* \* \* \*